Dec. 28, 1948.　　　　M. H. SWEET　　　　2,457,746
SENSITOMETER EMPLOYING REPEATING WEDGE MODULATOR
Filed Nov. 7, 1944　　　　　　　　　　　　3 Sheets-Sheet 1

INVENTOR.
MONROE H. SWEET
BY
ATTORNEYS

Dec. 28, 1948. M. H. SWEET 2,457,746
SENSITOMETER EMPLOYING REPEATING WEDGE MODULATOR
Filed Nov. 7, 1944 3 Sheets-Sheet 2
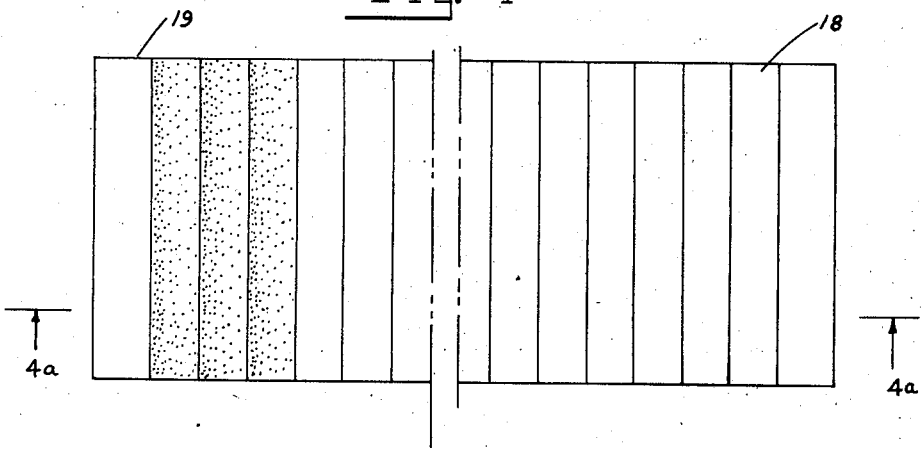
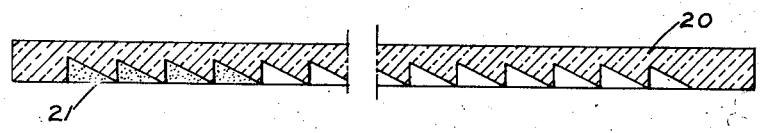
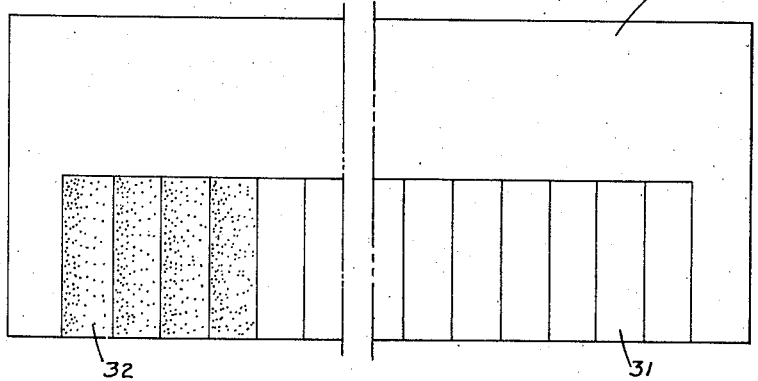
INVENTOR.
MONROE H. SWEET.
BY
ATTORNEYS Dec. 28, 1948.   M. H. SWEET   2,457,746
SENSITOMETER EMPLOYING REPEATING WEDGE MODULATOR
Filed Nov. 7, 1944   3 Sheets-Sheet 3

INVENTOR.
MONROE H. SWEET

BY
ATTORNEYS

Patented Dec. 28, 1948

2,457,746

UNITED STATES PATENT OFFICE 2,457,746

SENSITOMETER EMPLOYING REPEATING WEDGE MODULATOR

Monroe H. Sweet, Binghamton, N. Y., assignor to General Aniline & Film Corporation, New York, N. Y., a corporation of Delaware Application November 7, 1944, Serial No. 562,294

5 Claims. (Cl. 95—10)

1

This invention pertains to sensitometry, and more particularly, to an apparatus for exposing sensitized strips or layers generally known as a sensitometer. Normally, sensitometers are adapted to expose sensitized material in the form of strips in a stepped fashion so that a standard strip will have twenty-one different steps, each of which varies from the one preceding it, by an amount depending upon the length of exposure received. The variation is effected by progressively lengthening or shortening the time of exposure. For this reason such sensitometers are referred to as time scale instruments.

Among the objects of this invention is that of improving such sensitometers and thereby make it feasible to produce strips which shall have a continuously varying exposure, that is, an infinite number of constantly increasing exposures, each of which bears a relation to its predecessor depending upon a pre-determined gradient of exposure. These strips are especially desirable when they are to be interpreted in a recording-type densitometer or micro-densitometer since it is only possible with such a strip to produce a continuous graph of the density characteristics of the exposed layer.

Another object of the invention is to so modify a time-scale instrument that it may be employed to expose a strip, one-half of which shall have a stepped exposure and the other half which shall have a continuously varying exposure. In certain classes of work, such a strip is of advantage, and, heretofore, it has not been possible to attain this in a time-scale instrument.

Time-scale sensitometers normally vary the time of exposure as applied to each consecutive zone or step by an exposure aperture which moves relatively to the strip and determines the density for any particular step by limiting the time of exposure. Such an aperture is generally of a stepped construction and comprises a series of adjoining, rectangular apertures varying in length in a logarithmic manner.

According to one form of this invention, an optical wedge is employed to modify the effect of the stepped exposure aperture and to make possible as a result, a continuously varying density from one end of the strip to the other. Such a wedge may be termed a repeating, stepped, optical wedge and has as many steps as the instrument produces on the exposed layer or strip. These steps or zones are spaced equal distances apart in acordance with the stepped construction of the aperture so that one zone or step in the wedge will definitely coincide with or apply to a corresponding step produced by the aperture. Each of these steps or zones is so attenuated from a maximum to a minimum density that it has a continuous variation from one edge to the opposite, and the variation in density bears a definite relationship to the difference or increment of exposure between steps which would normally result from exposure controlled by the aperture only. As an example, in standard sensitometers, where the exposure difference between steps is the $\sqrt{2}$ times the previous exposure, this would mean that one edge of each step on the wedge will have a maximum density of .15 attenuated to zero at the opposite edge. Of course, if some other set of standards were to be formed, then these values given by way of example would obviously be changed.

In the production of the combined stepped and continuously varying strips, a similar instrument is to be employed except that the exposure aperture which controls the time element has a continuously curved, exposure-determining contour rather than the stepped construction above described. This continuously curving contour may be obtained by suitable modification of the existing instrument, or the instrument may be initially constructed that way. In addition to modulation of the exposure and thus the resulting density by the aperture, an optical wedge is to be employed which shall be plain at one portion of its effective area while the other portion is to be stepped and, in fact, is constructed in accordance with the repeating wedge above described. Normally, the wedge is separated along its longitudinal center line so that one-half of the strip or sensitized layer is affected by the stepped portion and the other half by the aperture only.

The invention will be described in detail by reference to specific embodiments thereof exemplified in the accompanying figures of drawing in which:

Fig. 4 is a plan view of an optical wedge adapted to produce a result as described herein.

Fig. 4a is a sectional view taken lengthwise of the wedge shown in Fig. 4.

Fig. 5 is a plan view showing the form of wedge adapted to produce the combined stepped and continuous exposure.

Figure 1:
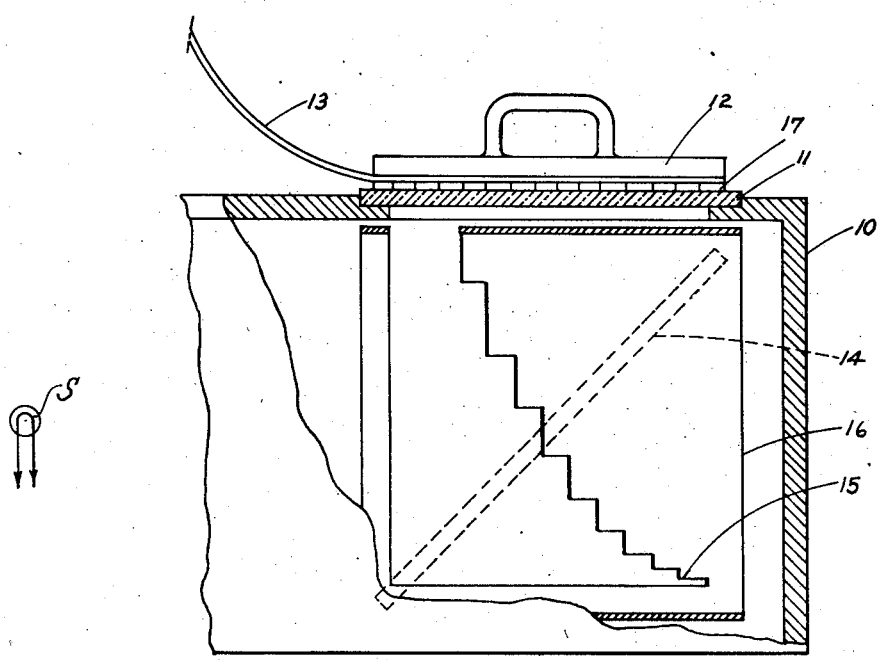
Fig. 1 is a section through part of a time-scale sensitometer to which the optical wedge may be applied.

Now referring to Fig. 1, a typical time-scale sensitometer has a casing 10, an exposure window 11, and a platen 12 beneath which is held at the exposure plane a sensitized layer 13. The layer may be in the form of an individual film strip of proper length or, more preferably, a roll of film mounted above the instrument. Light from a source S is reflected from a mirror 14 through the window 11, and onto the sensitized layer as permitted by an aperture defined by a stepped contour 15 within an exposure-controlling cylinder 16. This cylinder is shown in section, and the aperture continues for a major portion of the circumference of the cylinder which is rotated at a uniform, pre-determined speed. One rotation of the cylinder controls exposure of a strip. The contour defined by the steps 15 is such that the exposure of the strip is varied so that each step exposed will be subjected to the $\sqrt{2}$ times the period of exposure for its predecessor. That corresponds to log E increments of 0.15.

In order to effect a continuously varying rather than a stepped density in the resulting exposed strip, a wedge 17 is positioned so as to affect the light falling upon the strip, the preferred position being above the glass window 11 and beneath the strip, although it may be located at any position in which it will affect the light as above indicated. It may be of a size and shape to replace the glass 11. This wedge which will be described in detail later, is carefully made to have an identical number of steps corresponding with the steps 15 in the exposure aperture. The wedge must also have the delineating lines between steps coincide with points at which different exposure steps would be determined on the strip by the aperture steps in the drum 16. To that end, the wedge may be adjustable lengthwise of the strip, but it must also be of exact length and the various steps therein must occur at precisely the proper points along its length, that is, within laboratory limits of accuracy.

Figure 2:
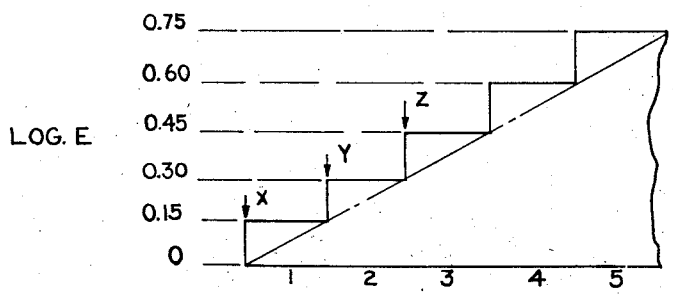
Fig. 2 is a diagrammatic view illustrating the log E increments as affected by the stepped aperture normally to be found in time-scale sensitometers.
Figure 3:
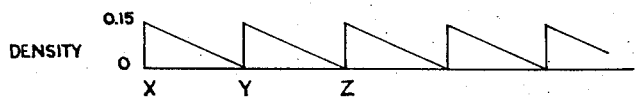
Fig. 3 shows diagrammatically the attenuation of the optical wedge adapted to effect the result as exemplified in Fig. 2 so as to produce a continuous-density variation rather than a stepped one.

In Fig. 2, the diagram shows how a strip or sensitized layer would be affected by exposure without the optical wedge in place. The steps which are numbered 1–5 and which would continue up to 21 or some other number are subjected to exposures, the logarithms of which are shown at the left side of the figure. The exposure level at X of step 1, which is $\sqrt{2}$, the logarithm of which is .15. The following exposures as at $y$, $z$, etc. are stepped by increments equal to the exposure level of the first step. Since it is desired to obtain as a result a strip in which the density varies continuously or progressively from one end to the opposite, it is necessary to provide a wedge which will effect the result in Fig. 2 so as to obtain a straight line variation rather than one stepped as shown. In Fig. 3, the horizontally disposed steps which correspond with the ascending steps shown above in Fig. 2, each step of the wedge must be attenuated as shown. At the point 0, the density in the wedge should correspond to the density resulting from the exposure given to the step X, Fig. 2. That density is actually one having a numerical value 0.15. Then it should progressively decrease to zero at $y$. Each succeeding step in the wedge is a duplicate of the first since the increment of exposure between steps, Fig. 2, has been taken as $\sqrt{2}$, the logarithm of which is 0.15. Of course, if the effect of the original stepped exposure aperture is that of giving different results from what are illustrated in Fig. 2, then the values of density for the wedge must be correspondingly changed. The principle is illustrated by the example given. The absorption of each step should vary from a maximum to zero, the said maximum being taken at such numerical value as exactly to equal in its light absorbing powers the increment of exposure added at each step by the progressively longer exposure apertures.

In Figs. 4 and 4a, such an optical wedge has been shown. Here the wedge generally indicated by numeral 18 has the steps, one of which is shown at 19 and which is attenuated in density as above described. Such a wedge may be made by many different processes, one, for example, being that of exposing a film or other transparent sensitized layer so as to effect therein the proper disposal of densities. An optical wedge may be made of photographic glass or plates of colloidal carbon or other well-known material for the purpose. Such a wedge would be similar to a neutral filter constructed in steps and having the density of each step modulated as above described.

In Fig. 4a, a section of a wedge of this type having repeating density steps is constructed by forming a rectangular strip of glass or other transparent material 20, cutting grooves of triangular cross-section at one side thereof, in which may be cemented or attached in any other manner triangular strips of proper density. In this event, it is not necessary to effect a variation of density within the glass itself since the strips 21 are of the maximum density throughout, but the attenuated effect is produced by properly shaping the section or thickness of the light absorbing medium.

In certain instances, it is desirable that strips be exposed in which one-half or other proportionate part of the strip shall have a stepped exposure while the other half shall have an exposure of continuous or progressively varying type. In Fig. 5, an optical wedge is illustrated which is adapted to be employed in cooperation with the form of exposure aperture shown in Fig. 6, such combination giving the above-described, desired result. While it is possible that a combination of stepped wedge as shown in Fig. 4 and the sensitometer exposure aperture of Fig. 1 may be employed to obtain this result, it is more desirably to modify the exposure aperture as in Fig. 6 and to employ the wedge of Fig. 5. If a stepped exposure aperture were to be used and its effect modulated by a combination plain and stepped wedge, it would be necessary to resort to very close limits in the construction of the wedge, and also to position it very precisely within the instrument so that corresponding steps in both the wedge and the aperture would affect the sensitized layer without overlapping of one upon the other, that being something which would obviously lead to an undersirable result. By modifying the exposure aperture so as to expose the sensitized layer to a continuously varying time of exposure and to modulate or modify that effect by the combined wedge of Fig. 5, makes it much more certain that there shall be no undesired overlapping effect, and also makes it unessential to resort to extremely fine limits of construction.

Figure 6:
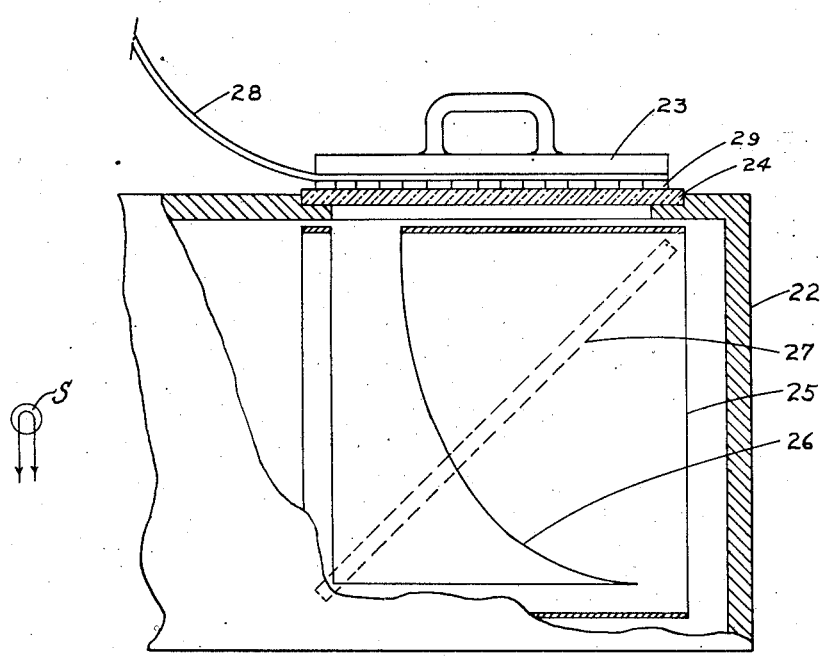
Fig. 6 is a view similar to Fig. 1 but showing a section of the instrument with which the wedge of Fig. 5 is to be used.

In Fig. 6, enough of a sensitometer has been shown to identify those parts to which the invention applies. The sensitometer includes a casing 22, a platen 23, glass window 24, and an exposure-controlling drum or cylinder 25, which has an aperture therein, one side of which is defined by the logarithmic curve 26. Light from a source S (not shown) falls upon mirror 27 and is reflected up through window 24 and onto a film 28 or other sensitized layer. A wedge 29 of the type shown in Fig. 5 is inserted between the window and the film, or may replace the window.

The optical wedge has a plain side 30 and a stepped portion 31, each step or zone 32 of which is attenuated as described with respect to the wedge of Figs. 2 and 3. This wedge may be produced by any of the known methods, for example, that part which is stepped may be made up as above described with respect to Figs. 4 and 4a, while of course the plain side merely comprises a transparent sheet of film, plastic of various types, or may be of optical glass of requisite thickness and optical properties.

The cylinder 23, Fig. 6, is adapted to be rotated, one turn thereof for a single exposure of the sensitized layer. The curve 26 is preferably a logarithmic one, but other curvatures may be employed for special work, and accordingly, the characteristics of the wedge, or at least, the stepped side thereof, will be modified accordingly.

The invention has been described by reference to its application in sensitometers of the type shown wherein the time of exposure is controlled by an aperture drum or cylinder. There are other time-scale sensitometers and, of course, the invention is applicable to them and details thereof need not be described here since the application of these principles to those instruments will be more or less obvious. The principles are also applicable to color work such as making tricolor exposures for sensitometric purposes.

In operation, the sensitometer is merely supplemented by the optical wedge, and in the second form of the invention, by a replacement exposure cylinder or drum, or by an attachment therefor which will give the desired curvature to the aperture. In its broadest aspect the above-described method and mechanism apply to modifying a time-scale exposure, either stepped or continuous, by the modulating effect of a repeating optical wedge, each step of which is attenuated and has an absorption varying from a maximum to zero and of such density at the maximum point as to absorb the added increment of exposure by which each step of the sensitized layer would otherwise be affected. The density of the wedge steps has been described as progressing from a definite figure down to zero. Of course, it may be that instead of terminating at zero, the density may end at a definite value above zero or fog density. In that event, the same principles apply and the so-called plain, or transparent, or clear side of the wedge may be of the same or a comparable density to that at the lower end of the gradient as considered for each step.

The invention has been described by reference to specific embodiments thereof, but it is to be understod that the inventive concept may be carried out in a number of ways. This application is, therefore, not to be limited to the precise details described but is intended to cover all variations and modifications thereof falling within the spirit of the invention and the scope of the claims.

I claim:

1. In a time-scale photographic sensitometer the combination of a light source, an exposure plane and means for retaining a sensitized layer at that plane, a stepped exposure aperture the steps of which progressively vary in extent for varying the exposure time during which light from said source is permitted to pass, and by which its effect on the layer is modulated, and means for further varying the effect of said light on the layer including an optical, repeating wedge positioned tranversely of the light beam which passes through said exposure aperture and having steps, the density of each of which varies from a maximum at one edge to a minimum at the opposite, said wedge being so positioned that its steps align with the steps of the said aperture so that each wedge step shall modulate light passing through its respective aperture only.

2. A time-scale sensitometer as defined in claim 1 wherein the exposure aperture is so stepped as to provide a series of exposures each varying from that adjacent by an equal increment and in which the absorption in each step of the optical wedge varies from a maximum density to a minimum density, the density difference being equal to the logarithm of the exposure E increment between time steps.

3. A time-scale sensitometer as defined in claim 1 wherein the exposure aperture is so stepped as to provide a series of exposures each varying from that adjacent by a multiple of $\sqrt{2}$ and in which the density in each step of the optical wedge varies from a maximum value of 0.15 to zero.

4. In a time-scale photographic sensitometer the combination of a light source, an exposure plane and means for retaining a sensitized layer at that plane, a rotatable cylinder having therein an exposure aperture through which light from said source is directed and by which the time of exposure of said light on said layer is modulated, said exposure aperture comprising a series of circumferentially extending slots varying in length logarithmically from a minimum to a maximum, and means for further varying the effect of said light on the layer including an optical, repeating wedge positioned transversely of the light beam which passes through said exposure aperture, having steps, the density of each of which varies from a maximum at one edge to a minimum at the opposite, said wedge being so positioned that its steps align with the steps of the aperture so that each wedge step shall modulate light passing through its respective aperture only, the absorption characteristics of said wedge steps varying linearly from a density equal to the log of the exposure increment between steps as affected by the exposure aperture, to zero.

5. A time-scale sensitometer as defined in claim 4 wherein the stepped exposure slots of which the aperture is comprised progressively increase in length from the shortest to the longest by increments the exposure difference between which is equal to $\sqrt{2}$, and in which the density in each step of the optical wedge varies from a maximum value of 0.15 to zero.

MONROE H. SWEET.

(References on following page)

REFERENCES CITED

The following references are of record in the file of this patent:

UNITED STATES PATENTS

| Number | Name | Date |
|---|---|---|
| 774,549 | Baese | Nov. 8, 1904 |
| 865,136 | Wadsworth | Sept. 3, 1907 |
| 970,111 | Ramstein-Gschwind | Sept. 13, 1910 |
| 1,325,204 | Raleigh et al. | Dec. 16, 1919 |
| 1,734,022 | Short | Oct. 29, 1929 |
| 1,883,884 | Doran | Oct. 25, 1932 |
| 2,223,008 | Michaelis | Nov. 26, 1940 |
| 2,312,010 | Akker | Feb. 23, 1943 |

FOREIGN PATENTS

| Number | Country | Date |
|---|---|---|
| 5,628 | Great Britain | of 1902 |
| 591,863 | Germany | Jan. 27, 1934 |

OTHER REFERENCES

Jones, "A Motion Picture Laboratory Sensitometer," Journal of the Society of Motion Picture Engineers, vol. 17, No. 4, pages 536–559, October 1931, pages 540–542.